Patented Apr. 19, 1949

2,467,453

UNITED STATES PATENT OFFICE 2,467,453

METHOD OF MAKING LOW-ASH CRUDE LACTOSE

Emory F. Almy, Columbus, Ohio, and Maurice E. Hull, La Grange, Ill., assignors to M & R Dietetic Laboratories, Inc., Columbus, Ohio, a corporation of Ohio No Drawing. Application January 11, 1946, Serial No. 640,670

4 Claims. (Cl. 127—31)

This invention relates to the treatment of sweet whey to stabilize the milk proteins therein against coagulation by the heat to which the whey is subjected during condensation prior to lactose crystallization, and more particularly to a method of making a low-ash content crude lactose from sweet whey.

By sweet whey we refer to whey produced in the usual process of making cheddar, Swiss or other cheese, or to the whey produced in the preparation of casein by rennet action. In such operations the curd is separated from sweet milk or skim milk, usually by the action of rennin or rennet, and without the development of any considerable acidity in the product. With ordinary care in handling, such whey can be readily produced within a range of 0.1–0.25% acidity, calculated as lactic acid. We have found that for the successful use of our invention the whey should not exceed 0.25% acidity. If the acidity of the whey is measured in terms of pH we have found that the range for satisfactory treatment appears to be of pH 5.4 to 6.8. Occasionally we have successfully treated batches of whey having a pH below 5.4.

Development of acidity in the whey by increasing the soluble and ionizable calcium content as well as the hydrogen-ion content tends to denature the whey protein. This denaturing action becomes increasingly irreversible with increasing time of exposure, and it appears that a point is reached beyond which the protein cannot be returned to its original degree of hydration by simply removing part of the excess of calcium-ion. As a result of these effects of time and acidity we have found that wheys of acidity in excess of 0.25% or pH of less than 5.5 can generally not be successfully stabilized by the method of our invention hereinafter described.

In the prior art processes of manufacturing crude lactose by direct crystallization of the lactose from highly condensed sweet whey derived from the manufacture of cheese or rennet casein, the crude lactose crystallizes slowly and the product obtained is hard to wash and usually has a high ash, protein and moisture content, making purification of the crude lactose difficult and costly. The reason for this appears to be due to the partial coagulation of the protein in the whey by heat during the condensation of the whey to the desired solids content in the order of about 55 to 62% by weight, or to the formation of a heavy body in the condensed whey which causes the lactose to crystallize in the form of very fine crystals which are difficult to remove, or to both of these causes.

It is now well-recognized in the dairy art that one of the main reasons for the instability of milk proteins to heat is due to a lack of a proper balance between certain salt ions in the proteins. In the majority of cases the heat instability of the proteins arises from an excess of cations such as calcium and magnesium ions in relation to the proportion of anions such as phosphate, citrate and bicarbonate ions. It is known that in such case the addition of such anions to the milk product will restore the proper balance between the salt ions and tend to overcome the instability of the protein towards heat; however, on the restoration of the ion balance in sweet whey to stabilize the protein towards heat in accordance with prior art practice, the stabilized whey which is then treated to form crude lactose still gives a sugar which is excessively high in ash.

In accordance with our invention, we have found that if sweet whey is treated with an alkali metal tetraphosphate of the general formula $M_6P_4O_{13}$ such as sodium tetraphosphate, not only is the protein of the whey stabilized towards heat, but the whey itself is changed so that upon condensation to the aforesaid high solids content the condensed whey has a thinner consistency than a correspondingly condensed whey which has not been similarly treated; and that the lactose crystals separate from the whey treated in accordance with the present invention in larger average sizes and greater purity than heretofore. The time required for satisfactory crystallization is greatly reduced, very good yields being obtained in 4 to 8 hours holding instead of the 18 to 36 hours ordinarily prescribed for the direct crystallization procedure. In addition, the crude lactose product obtained can readily be washed free from salts and colloidally suspended proteins to give a crude lactose of uniformly low ash, protein and moisture content.

We are not prepared to explain the exact reason for the improved behavior of whey when treated with the alkali metal tetraphosphates, but it would appear that these salts form heat-stable, soluble calcium salts with the excess calcium-ion in the whey. The protein of the condensed whey is also rendered less viscous and more easily removable from the lactose crystals by a minimum of washing. The calcium salt formed with the tetraphosphates is heat stable and remains soluble throughout the condensing process. It is more readily removed from the lactose by subsequent washing of the crystals than would be the case with the relatively insoluble calcium phosphate normally found in whey at the pH used in this process.

The action of the alkali metal tetraphosphates, particularly sodium tetraphosphate, in forming this heat stable, soluble calcium-complex is unique among the phosphates as a class, since we have not been able to obtain comparable results by stabilizing sweet whey with any of the other phosphates, either of the monophosphate or polyphosphate types. The action of these other phosphates in stabilizing the whey protein appears to depend largely upon the formation of difficultly soluble calcium salts, rather than upon the formation of heat-stable, soluble calcium-complexes, and for this reason the crude lactose product obtained from whey stabilized with these other phosphates is hard to wash and is high in ash content. This is particularly true in the case of trisodium phosphate, sodium hexametaphosphate and sodium pyrophosphate, which have been used heretofore in the stabilization of the proteins in milk.

In carrying out the process of the present invention, a sweet whey, which after draining from the curd had a pH of from about 5.4 to 6.8, preferably one which had a pH of from about 5.8 to about 6.65, was neutralized with an alkali such as sodium hydroxide to a pH of about 7 to 7.5 to facilitate the separation of the crystallized lactose from the serum of the concentrated whey. There was then added to this neutralized whey an alkali metal tetraphosphate, preferably sodium tetraphosphate, in an amount varying from about 0.0025% to about 0.06% by weight of the neutralized whey to stabilize the protein content of the whey. The stabilized whey was now concentrated in accordance with conventional procedures, preferably in vacuo, to a total solids content in the order of about 50 to 65%, preferably about 60%, and the lactose was then grained and crystallized, and the resulting truncated, wedge-shaped lactose crystals removed in any desirable manner, as by centrifuging, for example. These characteristic truncated, wedge-shaped crystals formed in accordance with our invention are readily removed by centrifuging. They normally will have the majority of crystals of a size range of from about 0.03–0.08 mm. across the smaller end of the wedge-shaped crystal and a length of 0.05–0.15 mm. The proportion of small crystals below these sizes is relatively small as compared to poorly crystallized batches which have not been similarly treated, thus making the product easier to centrifuge and wash, and contributing to a higher yield of lactose from the batch.

The crude lactose product obtained in accordance with this process can be washed readily and the washed crude lactose has a consistently low ash content, which varies from a minimum of about 0.15% up to an occasionally reached maximum of about 0.3%. Such ash content is lower than that heretofore obtained in crude lactose products which have been obtained by the direct crystallization of lactose from condensed wheys. Most of the crude lactose obtained from the process of our invention has an ash content below about 0.25% and usually about 0.2%. In comparative operations involving the use of trisodium phosphate and sodium hexametaphosphate as the stabilizer, the average ash content of the crude lactose obtained from the trisodium phosphate-stabilized wheys was above 0.3% and the average ash content crude lactose from the sodium hexametaphosphate-stabilized wheys was close to 0.5%.

The usual run of sweet whey has such a balance of salt ions that maximum stability of the protein content thereof towards heat may be obtained by adding an amount of the sodium tetraphosphate falling within the approximate percentage range above given. There are some rare instances wherein the balance between the salt ions is such that the phosphate ions are in excess of the calcium ions. It is manifest that in such instances the addition of phosphate ions in the form of sodium tetraphosphate is unnecessary. Wheys of this character occur very rarely and as a precautionary measure the wheys to be converted into crude lactose may be preliminarily tested to determine whether the salt ion relationship of the protein requires stabilization.

In general, an amount of sodium tetraphosphate in the order of 0.0025% (corresponding to ¼ part by weight of the phosphate to 10,000 parts by weight of whey) will produce a marked stabilization of the protein in substantially all wheys, although larger amounts of the stabilizer may be required to obtain maximum stability in some wheys. If too much of the phosphate ions are added in the form of sodium tetraphosphate, substantially beyond the amount required to balance the excess of calcium ions, the protein may become hydrated and may interfere with the formation of lactose crystals, or may actually be coagulated due to excess of the anion in such rather uncommon cases.

While we prefer to use sodium tetraphosphate as the stabilizer in accordance with our invention, the water-soluble tetraphosphates of the alkali metals such as potassium, lithium and ammonium may also be used. A sodium tetraphosphate suitable for use in accordance with this invention is that sold by the Rumford Chemical Works of Rumford, Rhode Island, under the trade name "Quadrafos."

We claim:

1. In the method of preparing a low-ash content crude lactose from a sweet whey having a pH no lower than 5.4 and a protein content unstable to heat, by condensation of the said whey to effect crystallization of lactose crystals, comprising incorporating in the said whey prior to the condensation an amount of sodium tetraphosphate sufficient to prevent heat coagulation and hydration of the protein, and condensing the resulting whey to a total solids content suitable for lactose graining and crystallization.

2. In the method of preparing a low-ash content crude lactose from a sweet whey having a pH no lower than 5.4 and a protein content unstable to heat, by condensation of the said whey to effect crystallization of lactose crystals, comprising incorporating in the said whey prior to the condensation an amount of an alkali metal tetraphosphate sufficient to prevent heat coagulation and hydration of the protein, and condensing the resulting whey to a total solids content suitable for lactose graining and crystallization.

3. In the method of preparing a low-ash content crude lactose from a sweet whey having a pH no lower than 5.4 and a protein content unstable to heat, by condensation of the said whey to effect crystallization of lactose crystals, comprising incorporating in the said whey prior to the condensation sodium tetraphosphate in an amount of from about 0.0025% to 0.06% by weight, based on the weight of the whey, and condensing the resulting whey to a total solids content suitable for lactose graining and crystallization.

4. In the method of preparing a low-ash content crude lactose from a sweet whey having a pH no lower than 5.4 and a protein content unstable to heat, by condensation of the said whey to effect crystallization of lactose crystals, comprising incorporating in the said whey prior to the condensation an amount of alkali metal tetraphosphate chemically equivalent to about 0.0025% to 0.06% by weight of sodium tetraphosphate, based on the weight of the whey, and condensing the resulting whey to a total solids content suitable for lactose graining and crystallization.

EMORY F. ALMY.
MAURICE E. HULL.

REFERENCES CITED

The following references are of record in the file of this patent:

UNITED STATES PATENTS

| Number | Name | Date |
|---|---|---|
| 2,019,666 | Fiske | Nov. 5, 1935 |
| 2,064,110 | Hall | Dec. 15, 1936 |
| 2,299,783 | Allen | Oct. 27, 1942 |
| 2,341,425 | Clifford | Feb. 8, 1944 |
| 2,360,033 | Baumann | Oct. 10, 1944 |

Certificate of Correction

Patent No. 2,467,453.　　　　　　　　　　　　　　　　April 19, 1949.

EMORY F. ALMY ET AL.

It is hereby certified that error appears in the printed specification of the above numbered patent requiring correction as follows:

Column 1, line 37, after the word "than" insert *about*;

and that the said Letters Patent should be read with this correction therein that the same may conform to the record of the case in the Patent Office.

Signed and sealed this 13th day of September, A. D. 1949.

[SEAL]

JOE E. DANIELS,
*Assistant Commissioner of Patents.*